June 6, 1933.  A. LEESON  1,912,584
COIN FREED WEIGHING APPARATUS
Filed July 5, 1932    4 Sheets-Sheet 1

Inventor:- Archibald Leeson.
Per:- George E. Folkes.
Attorney.

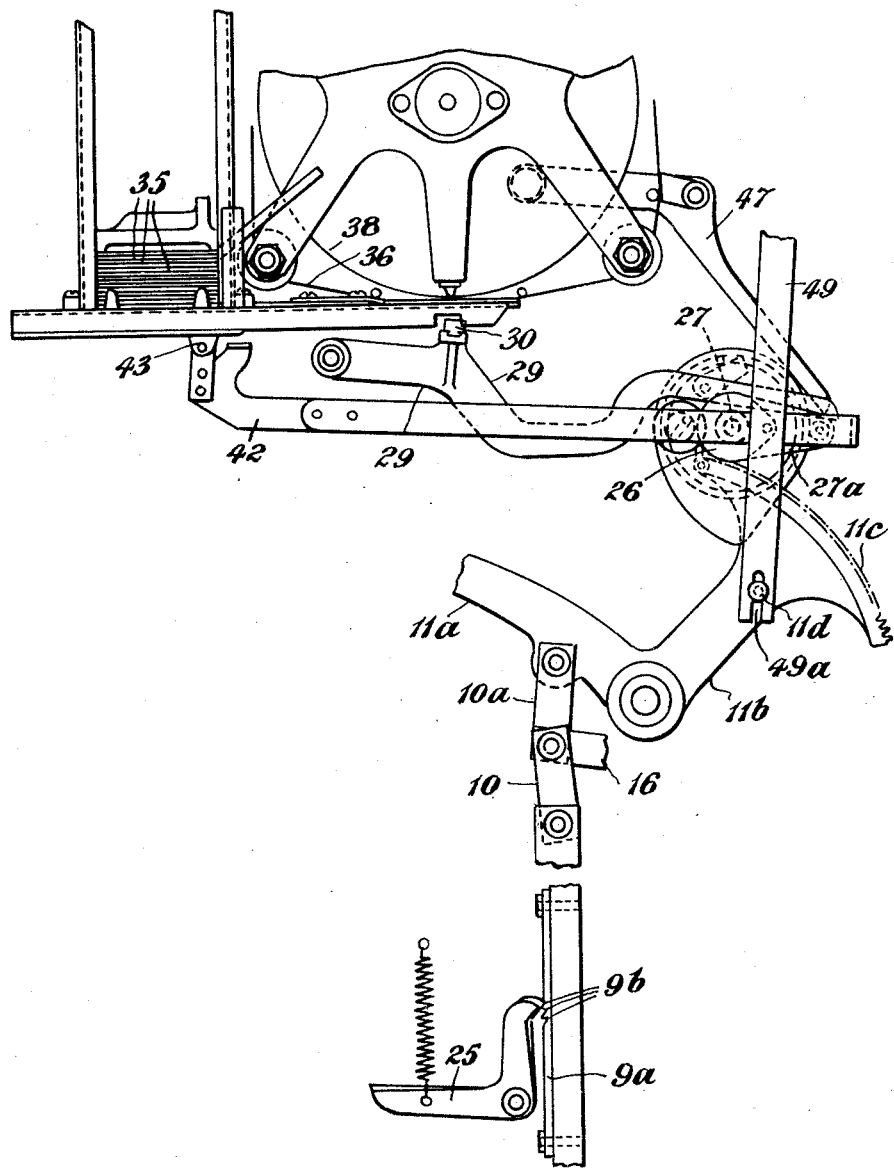

June 6, 1933.   A. LEESON   1,912,584
COIN FREED WEIGHING APPARATUS
Filed July 5, 1932    4 Sheets-Sheet 3
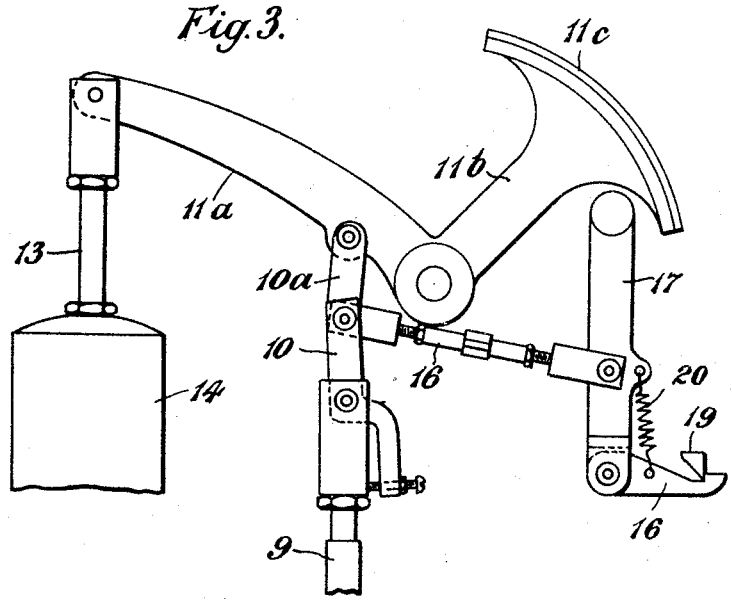
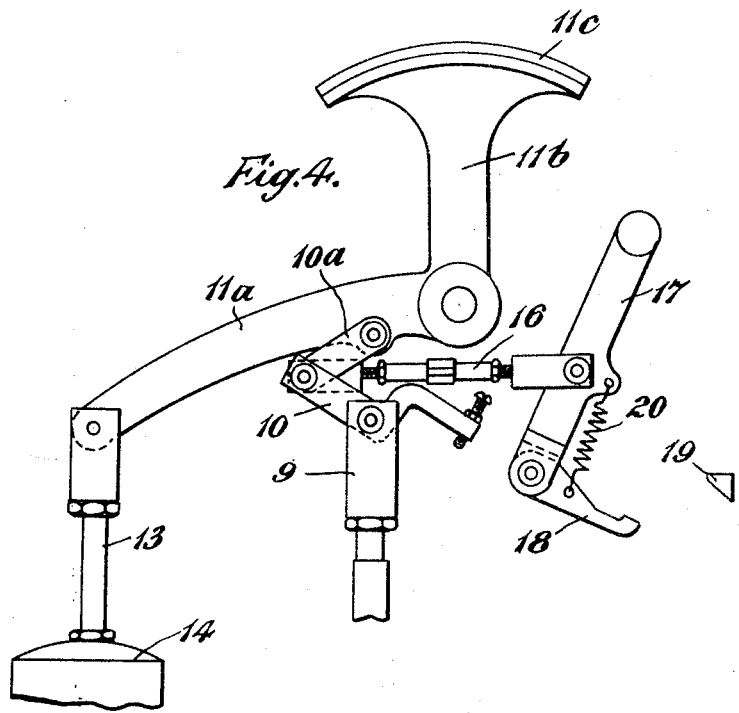
Inventor:- Archibald Leeson.
Per:- George E. Folkes.
Attorney.

June 6, 1933.  A. LEESON  1,912,584
COIN FREED WEIGHING APPARATUS
Filed July 5, 1932  4 Sheets-Sheet 4
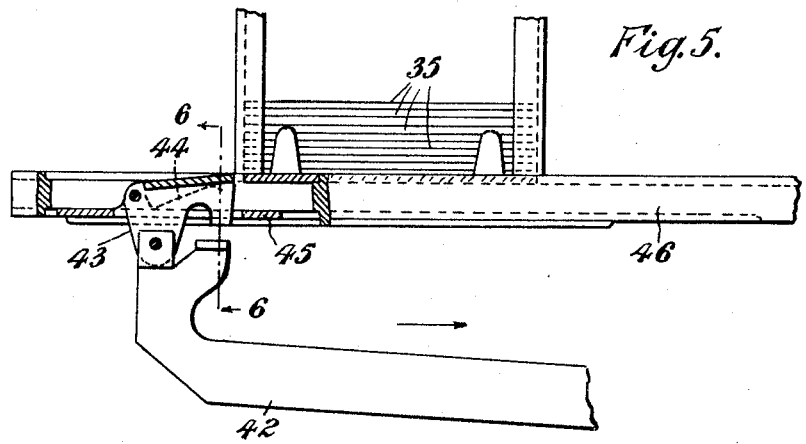
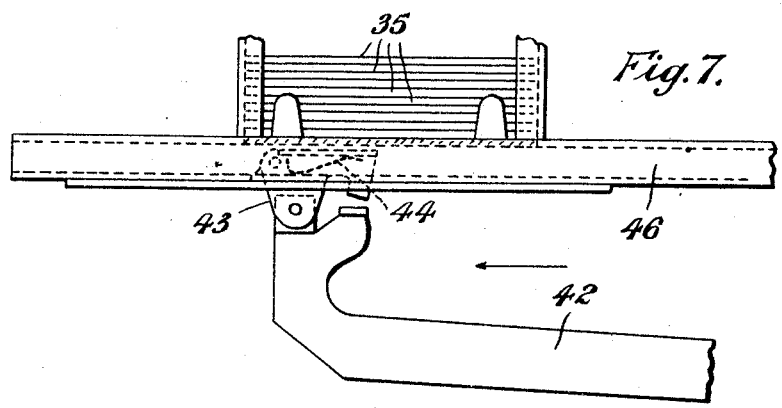
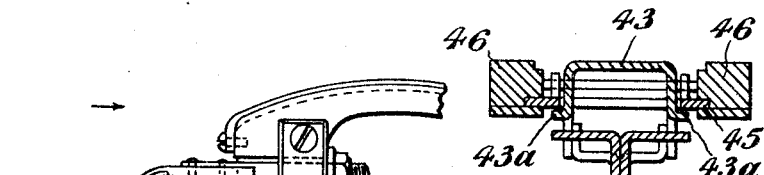
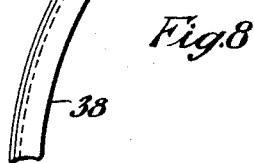
Inventor:- Archibald Leeson.
Per:- George E. Folkes,
Attorney.

Patented June 6, 1933

1,912,584

UNITED STATES PATENT OFFICE

ARCHIBALD LEESON, OF BIRMINGHAM, ENGLAND, ASSIGNOR TO W. & T. AVERY LIMITED, OF BIRMINGHAM, ENGLAND

COIN FREED WEIGHING APPARATUS

Application filed July 5, 1932, Serial No. 620,801, and in Great Britain August 8, 1931.

This invention has reference to improvements relating to coin freed weighing apparatus and is concerned particularly with coin freed weighing apparatus of the kind employing a weight recording mechanism wherein the energy for operating the mechanism is obtained by means of a weight which is raised when a load is placed on the scale platform and released upon the insertion of a coin whereby the potential energy stored in the raised weight is allowed to perform work and set in operation the requisite cycle of movements of the mechanism.

The present invention has for its object the provision of a simplified mechanism for use in coin freed weighing apparatus of the aforesaid kind which ensures the operation of the apparatus even when the coins specified for use therewith are relatively light and which reduces the number of operative parts thereby making for an efficient operation of the apparatus.

The invention consists of an improved coin freed weighing apparatus of the kind hereinbefore referred to characterized in that the scale platform has connection with the member through which the actuating weight acts through a toggle linkage which, in the unbroken position, effects the setting of the weight and which linkage is broken on the insertion of the coin and permits the falling weight to perform its work and thereby cause the prescribed cycle of operations to be carried out.

The invention further resides in the details of construction of the improved coin freed weighing apparatus to be described hereinafter.

The invention will now be described with particular reference to the accompanying drawings, wherein:—

Figure 2 is a front elevation illustrating, in greater detail, the method of transmitting the movement from a lever carrying the weight to the indicating and recording mechanism.

Figure 3 is a detail view illustrating, in greater detail, the method of operating the toggle linkage the said linkage being shown in the unbroken position.

Figure 4 is a similar view to Figure 3 but showing the toggle linkage in the broken condition.

Figure 5 is a part sectional side elevation of a portion of the ticket feeding mechanism showing the shuttle for feeding the tickets in its rearmost position in readiness to feed a ticket from the column on the forward motion of the said shuttle.

Figure 6 is a sectional view taken on the plane indicated by the line 6—6 Figure 5.

Figure 7 is a similar view to Figure 5 but illustrating the shuttle in an intermediate position during the return movement, and Figure 8 is a fragmentary view illustrating the method of anchoring the type strip to the periphery of the wheel member which is positioned according to the load upon the scale platform.

Figure 1:
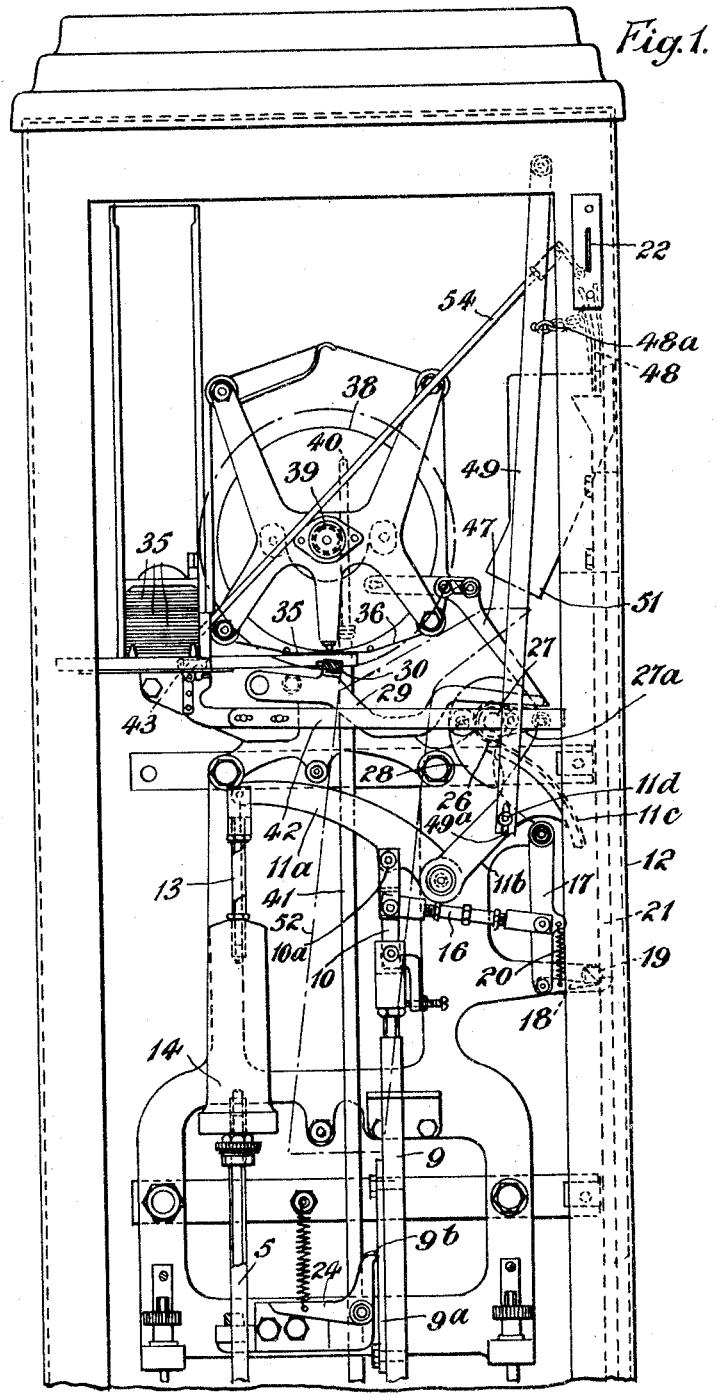
Figure 1 is a front elevation of the upper portion of the weighing apparatus with the toggle linkage in the unbroken position.

The scale platform (not shown) has connection by way of a push rod 9 to the lower link 10 of a toggle linkage the upper link 10ª whereof is pivotally connected to the longer arm 11ª of lever fulcrumed on a spindle carried by the housing 12 within which the mechanism is disposed. The said longer arm 11ª has pivotally suspended therefrom a rod 13 carrying the actuating weight 14 said actuating weight in turn being connected to a rod 15 which is attached to the piston of a dashpot of known kind for damping the movements of the falling weight in a known manner. The common pivot of the links 10, 10ª is connected by means of an adjustable tie-rod 16 to a pivotally mounted arm 17 having pivotally secured to the lower end thereof a trip lever 18 said trip lever 18 normally being engaged with a stop 19 by means of a spring 20. The end of the trip lever 18 is located within the chute 21 through which the inserted coin travels after its insertion in the coin slot 22. Intermediate its length the push rod 9 is provided with a plate 9ª having therein ratchet teeth 9ᵇ which co-operate with a detent carried by the shorter arm of a spring controlled bell crank lever 24 the tail whereof is located in the path of the weight 14 so as to be struck thereby during a falling movement thereof for a purpose to be set out more clearly hereinafter.

The shorter arm 11ᵇ of the lever from which the weight 14 is suspended is provided with a toothed segment 11ᶜ the teeth whereof mesh with the teeth of a pinion 26 mounted on a rotatable spindle 27. Mounted on the spindle 27 is a cam 28 which is ratchet controlled so that a free-wheel effect results when the segment 11ᶜ is rocked in a clockwise direction. The cam 28 carries a roller 28ᵃ adapted to cooperate with a lever 29 carrying a platen 30 for pressing a ticket 35 and printing tape 36 against a type face carried by a strip 37 secured on the periphery of a wheel 38 the axle whereof carries a pinion 39 which meshes with a rack 40 secured to the upper end of a rod 41 which has connection with a draw-bar (not shown) which in turn is connected to the automatic resistant which may be either a spring, pendulum or the like and with the lever system of the scale platform whereby, during the operation of the apparatus, the said wheel 38 is rotated an amount corresponding to the load. The spindle 27 also carries a crank 27ᵃ to which is attached a connecting rod 42 adjustable as to length said rod 42 having pivotally connected to the other end thereof a shuttle 43 which co-operates with a spring 44 so that the upper end of the shuttle when in the rearward position aligns itself behind the lowermost ticket of a column of tickets located in the ticket supply. The shuttle 43 is pivotally secured to a plate 45 slidably mounted in guides 46 the pivotal connection of the shuttle 43 to this sliding plate 45 being disposed above the point of connection of the shuttle 43 to its connecting rod. This disposition of the pivots occasions a couple being set up on a rearward movement of the connecting rod 42 which results in the shuttle 43 being drawn downwardly whereby it is caused to ride clear of the lowermost ticket 35 in the column upon the return movement. The shuttle 43 is provided with downwardly depending portions carrying lateral projections 43ᵃ which limit the degree of upward movement permitted to the shuttle. The cam 28 co-operates with a bell crank lever 47 which effects a feeding of the type printing tape 36 in known manner.

Located between the coin slot 22 and the coin chute 21 is a pivotally mounted diverter chute 48 which is connected by means of a chain 48ᵃ to a depending pivotally mounted arm 49 the lower end of which is provided with a slot 49ᵃ within which engages a pin 11ᵈ projecting from the shorter arm 11ᵇ of the lever carrying the actuating weight 14, the said arm 49 serving to effect a lateral movement of the diverter chute 47 in the event of a movement of the segment 11ᶜ the said movement resulting in an inserted coin passing by way of chutes 51, 52 to a return coin receptacle located at the front of the housing 12 thereby preventing the second insertion of a coin while the machine is in the operative condition.

The diverter chute 48 is also adapted to be actuated by a slidable rod 54 when the supply of tickets is exhausted.

The type is chemically etched or engraved on the strip 36 one end of which is anchored to the periphery of the wheel 38 by a set screw 56, the other end of the strip being inserted within a slot formed in the outer end of a bolt 57 slidably mounted in a slot cut in the wheel 38 the end of the strip 36 inserted in the slot in the said bolt 57 being secured by means of pins. The bolt 57 co-operates with a nut and washer 59 and 60 respectively whereby tension may be applied to the strip to secure it firmly to the periphery of the wheel 38. The slot in the drum through which the bolt 57 is passed is closed by a cover plate 61.

The operation of the apparatus is as follows:—

Upon a person standing on the platform the push rod 9 is caused to move upwardly and through the unbroken toggle linkage 10, 10ᵃ to lift the longer arm 11ᵃ of the weight carrying lever thereby raising the weight 14, said rod being maintained in the raised position by reason of the engagement of the detent of the lever 24 with the teeth of the plate 9ᵃ. Simultaneously the rod 41, rack 40 and pinion 39 effects a setting of the type wheel 38. Upon the insertion of a coin in the coin slot 22 the coin subsequently traverses the chute 21 and in its fall strikes the trip lever 17 thereby releasing the said lever from engagement with the stop 19 thus allowing the toggle linkage to break and the weight 14 to fall. The falling of the weight 14 causes a rocking of the lever from which it is suspended whereby the toothed segment 11ᶜ carried by the shorter arm of the said lever rotates the pinion 26, spindle 27 and cam 28.

The rotation of the spindle 27 through the crank 27ᵃ and connecting rod 42 causes the shuttle 43 to feed a ticket from the column below the type wheel 38. The rotation of the cam 28 causes the printing lever 29 to press the ticket in the printing position against the type surface and thereby effect a printing operation.

The weight 14 in its fall strikes the catch lever 24 and removes the detent out of engagement with the ratchet teeth thereby allowing of a making of the toggle linkage and the re-engagement of the trip lever 18 with the stop 20 when the load is removed from the platform.

What I claim is:—

1. A coin freed weighing apparatus, of the type hereinbefore referred to, embodying a type carrying member which is automatically positioned according to the load applied, a movable member, a weight supported from the said movable member, a toggle linkage in connection with said member and the weighing platform and through which the lifting movement is imparted to the aforesaid weight, a trip lever adapted to be released by a coin, a connection between the said trip lever and the centre pivot of the toggle linkage which causes the said toggle linkage to collapse when the lever is tripped and means driven from the movable member for effecting ticket feeding and printing operations.

2. A coin freed weighing apparatus, of the type hereinbefore referred to, embodying a type carrying member adapted to be positioned automatically according to the load applied, a lever, a weight suspended from said lever, a toggle linkage in connection with said lever and the weighing platform, means for normally maintaining the toggle linkage rigid whereby the said weight is lifted through the rigid toggle linkage when a load is applied to the weighing platform, a trip lever adapted to be freed by a falling coin, means connecting the said trip lever and the common pivot of the toggle linkage whereby on release of the trip lever the toggle linkage is caused to collapse to permit of the falling of the weight, a ticket magazine, a shuttle reciprocably mounted relatively to said magazine for intermittently feeding tickets from the magazine to the aforesaid type carrying member, a rod pivotally connected to said shuttle and to a driving means, a driving connection between said driving means and the aforesaid lever and a printing lever for causing a ticket to be impressed against the type of the type carrying member during a rocking of the lever.

3. A coin freed weighing apparatus, of the type hereinbefore referred to, embodying a rotatable type carrying member adapted to be rotated according to the load placed upon the weighing platform, a lever, a weight suspended from one arm of said lever, a toggle linkage connecting said lever and the weighing platform and which remains rigid so as to lift the said weight when a load is applied to the weighing platform, a trip lever adapted to be freed by a falling coin, connecting means between the trip lever and the centre point of the toggle linkage which cause the toggle linkage to collapse when the trip lever is tripped and thereby permit the weight to fall and effect a rocking of the weight carrying lever, a ticket magazine, a shuttle which in its rearmost position aligns itself with the rear edge of the lowermost ticket in the magazine, a toothed segment carried by an arm of the aforesaid lever, a rotatably mounted pinion the teeth whereof mesh with the teeth of the segment and which is rotated by reason of the said meshing when the weight carrying lever is rocked, a cam device having a free wheel connection with the pinion, a crank carried by the cam device, a rod connecting the shuttle and the crank whereby on a rocking of the weight carrying lever a ticket is fed by the shuttle below the type carrying member and a printing lever adapted to be operated from the cam device for pressing a ticket in the printing position into contact with the type surface for effecting a recording of a printing operation.

4. A coin freed weighing apparatus, of the type hereinbefore referred to, embodying a type carrying member which is automatically positioned according to the load applied, a movable member, a weight supported from the said movable member, a toggle linkage in connection with said member and the weighing platform and through which the lifting movement is imparted to the aforesaid weight, a trip lever adapted to be released by a coin, a connection between the said trip lever and the centre pivot of the toggle linkage which causes the said toggle linkage to collapse when the lever is tripped, means driven from the movable member for effecting ticket feeding and printing operations and means for maintaining the weight in the raised position prior to the release of the trip lever.

5. A coin freed weighing apparatus, of the type hereinbefore referred to, embodying a type carrying member which is automatically positioned according to the load applied, a movable member, a weight supported from the said movable member, a toggle linkage in connection with said member and the weighing platform and through which the lifting movement is imparted to the aforesaid weight, a trip lever adapted to be released by a coin, a connection between the said trip lever and the centre pivot of the toggle linkage which causes the said toggle linkage to collapse when the lever is tripped, means driven from the movable member for effecting ticket feeding and printing operations, means for maintaining the weight in the raised position prior to the release of the trip lever and means operated by a falling of the weight for releasing the said holding means.

In testimony whereof I have signed my name to this specification.

ARCHIBALD LEESON.